May 24, 1966    E. C. LENTZ    3,252,767
EXHAUST SYSTEM
Filed Jan. 21, 1963    3 Sheets-Sheet 2
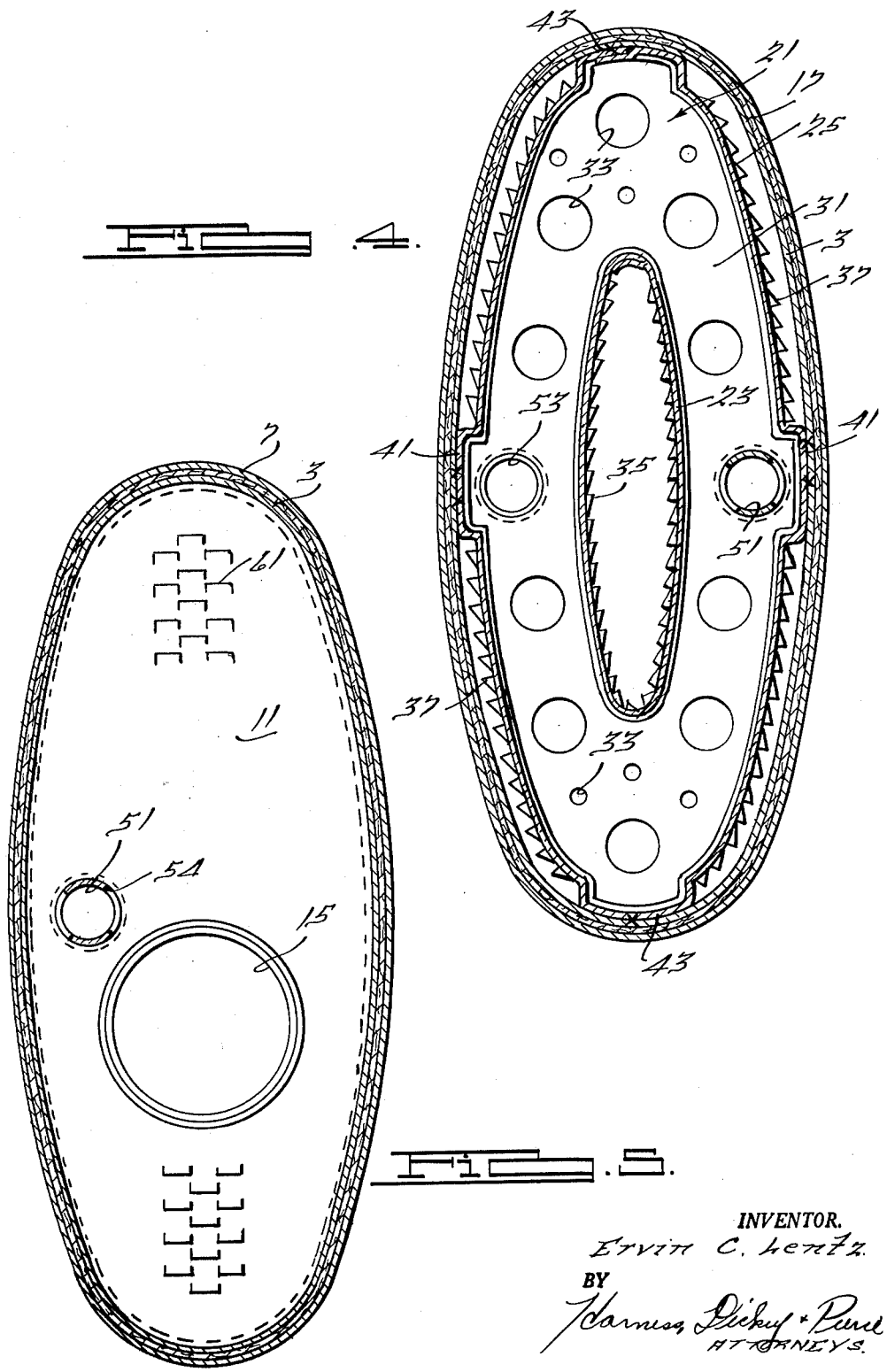
INVENTOR.
Ervin C. Lentz
BY
Harness, Dickey & Pierce
ATTORNEYS.

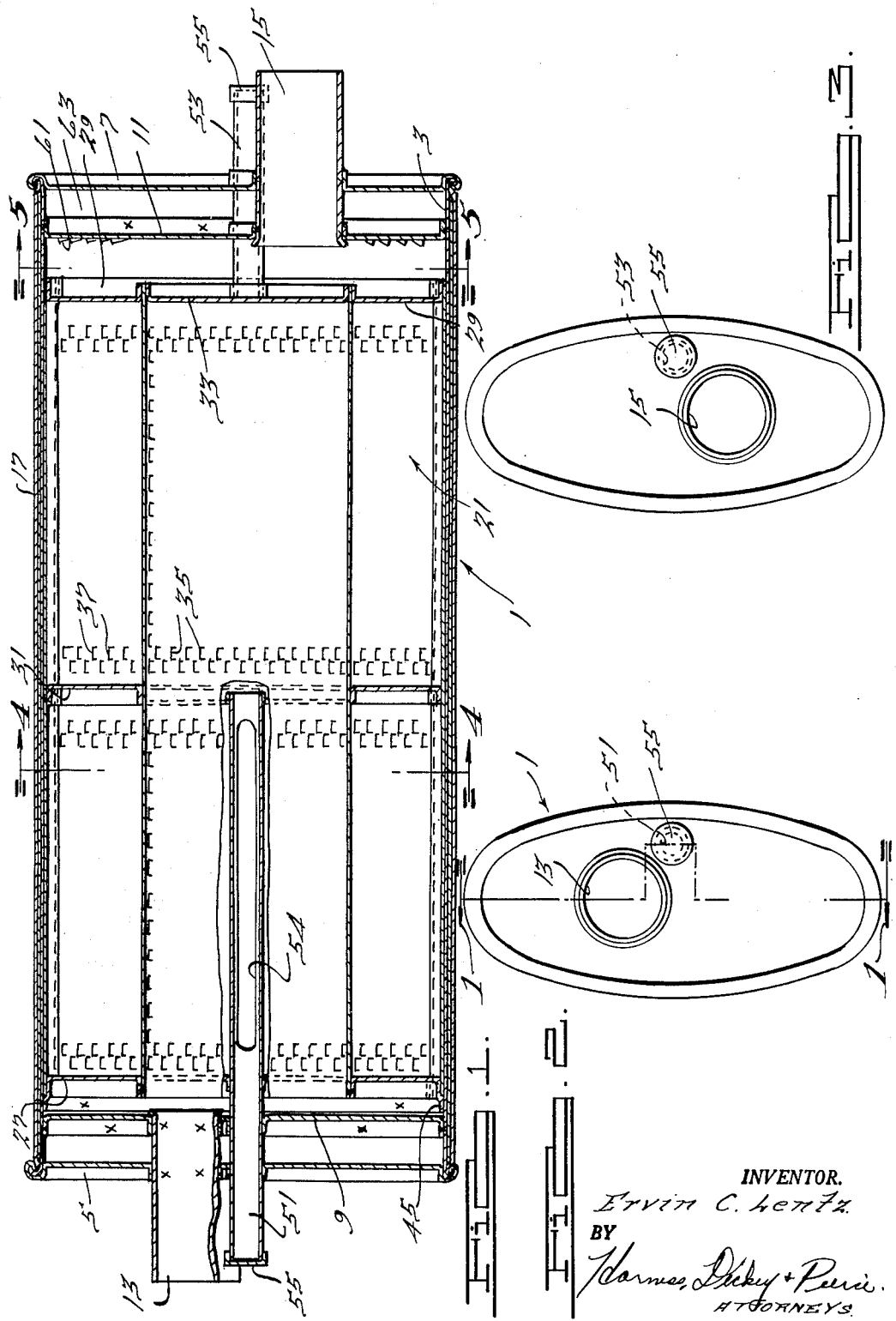
INVENTOR.
Ervin C. Lentz

May 24, 1966  E. C. LENTZ  3,252,767
EXHAUST SYSTEM
Filed Jan. 21, 1963  3 Sheets-Sheet 3
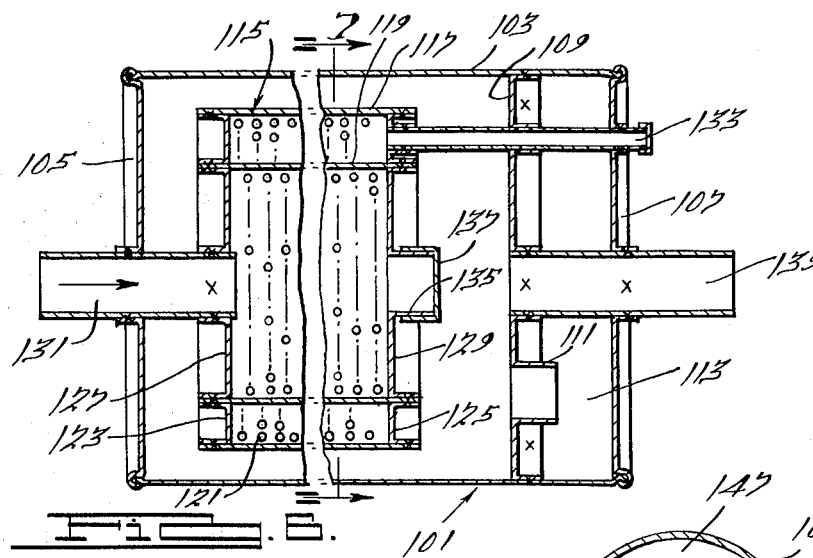
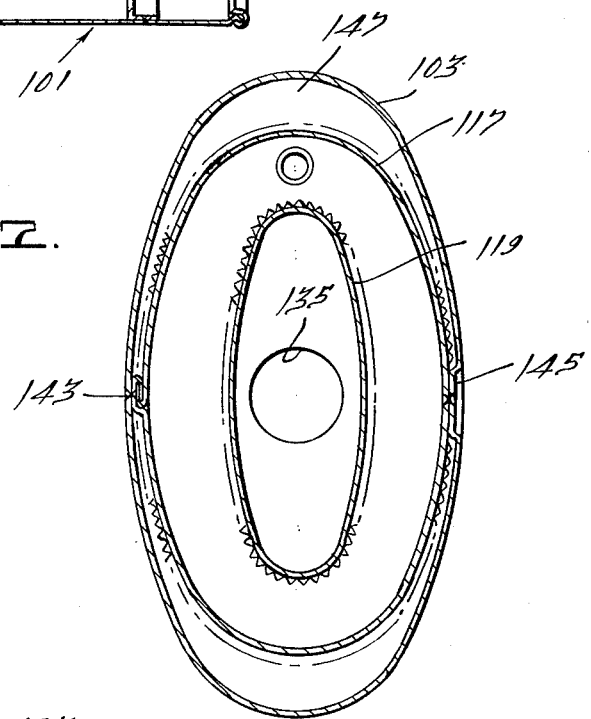
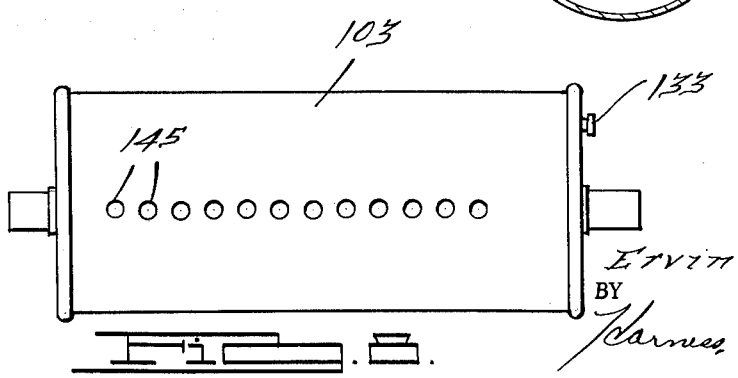
INVENTOR.
Ervin C. Lentz
BY
Carnes, Dickey & Pierce
ATTORNEYS ID # United States Patent Office 3,252,767
Patented May 24, 1966

3,252,767
EXHAUST SYSTEM
Ervin C. Lentz, Jackson, Mich., assignor to Walker Manufacturing Company, a corporation of Delaware
Filed Jan. 21, 1963, Ser. No. 252,778
8 Claims. (Cl. 23—288)

This invention relates to the exhaust systems for automobiles, trucks, and other vehicles employing internal combustion engines, as well as to the exhaust systems for stationary internal combustion engines. In particular, the invention is concerned with the elimination from the exhaust gases of harmful, unburned constituents. In particular, the invention concerns devices employing a catalyst to assist in the combusion of the unburned constituents.

As is well known, at the present time considerable effort is being made in the automotive and allied industries to develop a low cost but efficient and long lasting unit that can be inserted in the automobile exhaust system for the purpose of burning up those unburned constituents in exhaust gases which are thought to be a prime factor in the formation of smog in certain areas. It is desirable that such a unit, from the standpoint of the user, be low cost and long lasting and this means that the design should be such as to adapt it to mass manufacture as well as incorporate sufficient flexibility and strength so that the great temperature differential that it must withstand, as well as the rough usage on automobiles and trucks, will not cause it to break down after a relatively short time on the vehicle. Additionally, the device should be designed so as not to unduly increase the back pressure on the engine and should be sized in such a way that it can be inserted in a safe and satisfactory out-of-the-way position on the automobile or truck and, preferably, be capable of silencing the exhaust gases so that it can be substituted for the usual exhaust muffler.

From the standpoint of its effectiveness in causing conversion of the unburned constituents, the device must be capable of operating at a high efficiency when handling extremely rich exhaust gas mixtures and very lean ones, corresponding to a wide range of engine operating conditions. The unit must be capable of rapid warm-up since the catalyst material ordinarily does not become effective until temperatures in the neighborhood of 500° F. are reached. On the other hand, the reaction is exothermic, giving off heat, and this must be controlled or dissipated in such a way that the device does not overheat and becomes a serious danger to people and property. In order for the chemical reaction to occur, the gases must be in contact with the chemical for a certain minimum period of time; but, on the other hand, a certain maximum back pressure must be maintained and a small size must be maintained, meaning that there cannot be too much of the catalyst for the gases to flow through. In addition, the catalyst may become depleted or inactive and it is desirable to provide a means whereby it can be replaced easily without substitution of one container for another.

These and various other requirements which, as often as not, conflict with each other make the design of a satisfactory catalyst container for exhaust systems a very difficult and complicated matter. It is the purpose of the present invention to resolve many of these conflicts and satisfy many of these requirements by means of a radial flow type catalyst container construction in which the exhaust gases enter the center of the structure, which in general has a curvilinear cross section that may be oval or elliptical in cross section and then flow radially outwardly through an annular or oval catalyst bed and then to the outlet of the container. The catalyst bed is, in general, curvilinear shaped in cross section and mounted inside the curvilinear shell of the catalyst container in such a way as to provide numerous advantages as will become apparent or will be pointed out hereinafter.

The invention is illustrated in the accompanying drawings in which:

FIGURE 1 is a longitudinal cross section through one form of the improved catalyst container as taken along the line 1—1 of FIG. 2;
FIG. 2 is an end elevation taken from the left, or inlet end, of the catalyst container;
FIG. 3 is an end elevation taken from the right or the outlet end of the catalyst container as it appears in FIG. 1;
FIG. 4 is a cross section along the line 4—4 of FIG. 1;
FIG. 5 is a cross section along the line 5—5 of FIG. 1;
FIG. 6 is a section corresponding to FIG. 1 but shows a modified form of the invention, in a somewhat schematic matter, and, in addition, shows the filler tube from the outlet end of the container revolved into the plane of the cross section;
FIG. 7 is a cross section along the line 7—7 of FIG. 6; and
FIG. 8 is a bottom elevation of the unit showing in FIGS. 6 and 7.

The catalyst container 1 that is shown in FIGS. 1–5 comprises an outer housing including a sheet metal outer shell 3 which is oval in cross-sectional shape. The opposite ends of this shell are closed by end headers 5 and 7 at the inlet and outlet ends, respectively. Inside of the shell 3 is a transverse partition 9 adjacent the inlet end and a second partition 11 adjacent the outlet end. The partitions 9 and 11 have circumferential flanges which are spot-welded to the shell 3, the small "x's" indicating such spot welds throughout the drawings. Gas enters the interior of the shell 3 through an inlet bushing 13, which is spot-welded inside of the flanged necks in the inlet header and the partition 9, and it leaves the shell 3 through an outlet bushing 15 which is spot-welded to flanged necks in the partition 11 and the outlet header 7. Wrapped around the outside of the shell 3 are two additional layers which may be of asbestos and sheet metal, respectively, as indicated at 17, to provide additional heat and sound insulation. Those familiar with the construction of exhaust mufflers for automobiles and trucks will realize that the foregoing structure is substantially the same as that found in exhaust mufflers and, hence, existing equipment and procedures for making exhaust mufflers can be employed in building the container 1.

Inside of the shall 3 an oval or annular catalyst bed 21 is located. In the illustrative embodiment, this comprises an inner oval shell 23 and an outer oval shell 25 which is substantially coaxial with the inner shell 23. The annual or oval bed has a maximum inner and outer surface area and therefore provides minimum flow resistance or back pressure. As can be seen in FIG. 4, the major and minor axes of the catalyst bed 21 coincide substantially with the major and minor axes of the shell 3. The catalyst bed shells 23 and 25 are joined together by means of annular, flanged end partitions 27 and 29 which are spot-welded to the respective shells as well as by a perforated intermediate partition 31 which contains sufficient openings 33 to permit relatively free flow of catalyst particles and gas through the partition. The end of the inner shell 23 is closed by a partition 33. Since gas flows directly from the inlet bushings 13 into inner shell 23 the latter constitutes the inlet face of the catalyst bed 21 while the shell 25 constitutes the outlet face. The inner wall 23 is provided with louvers 35 that extend inwardly toward the center of the assembly and the outer wall 25 is provided with louvers 37 that extend outwardly away from the center of the assembly. These louvers are preferably of the form described in U.S. Patent No. 1,949,074 and are sufficient in number, size, and location to furnish a minimum resistance to flow of gas while at the same time being capable of retaining the catalyst particles in the bed 21 and providing a desired flow pattern through the catalyst bed. Since both inner and outer bed shells are oval or annular, the width of the bed (length of gas travel) is substantially uniform at all points.

It will be seen that the shells 23 and 25 and the partitions 27, 29, 31, and 33 are all formed from originally flat steel stock which may be perforated or louvered and then stamped or rolled to the desired shape. The tubular parts may be lockseamed or the ends may be overlapped and seam-welded. All of this is structure that may be readily formed on existing muffler equipment and with present know-how.

The catalyst bed 21 is attached at opposite ends of the minor axis to the shell 3 by spot welds, or suitable means, at longitudinally spaced intervals, preferably about 2″. For this purpose the outer shell 25 is embossed outwardly as can be seen at 41. The embossment may, for example, take the form of a rib running longitudinally for the full length of the shell 25 or it may be a series of embossments spaced longitudinally from one another. As seen by the "x's" in FIG. 4, the ribs 41 are spot-welded to the shell 3 so that the two will furnish structural support for each other. The portions of the annular or oval shell of the bed circumferentially intermediate the embossments or ribs 41 are spaced inwardly from shell 3 to provide 4 separate longitudinally extending segmental cavities having a cross sectional configuration generally corresponding to the shape of the shell. If desired, the ends of the shell 25 at opposite ends of the major axis may be embossed outwardly in ribs or spaced embossments 43 to contact the shell 3 and be spot-welded thereto. Alternatively, the spot weld between the ribs 43 and the shell 3 can be omitted and mere contact utilized to furnish some support, such an arrangement permitting more relative movement during the heating and cooling of the container.

As can be seen in FIG. 1, the partition 27 at the inlet end of the catalyst bed has additional flange 45 which is formed on a larger diameter so that it is, in effect, an extension of the outer shell rib 43 and thus may be spot-welded to the outer shell 3 to close the cavities between the outer shell 25 and the shell 3 relative to the inlet passage. The partition 29 at the other end of the bed is not spot-welded to the shell and the cavities are connected to the outlet passage.

The catalyst particles that would be in the bed 21 lose their effectiveness after a certain period of usage and it is desirable to be able to remove the old particles and replace them with fresh particles. For this purpose, a pair of catalyst removal and filler tubes 51 and 53 are provided. As can be seen in FIG. 1, the tubes 51 and 53 extend through and are mounted in suitable flanged openings in the various partitions and end headers, the inner end of each of the tubes being supported in the interior partition 31. The sides of the tubes are slotted and open as seen at 54 and the outer ends of the tubes are closed by suitable caps 55. When it is desired to remove catalyst, both of the tubes are uncapped and air is blown through one of them which will force the catalyst particles to flow out of the other. When it is desired to fill the bed 21, one of the tubes is closed and the catalyst is blown into the other until the bed 21 is completely filled and until both tubes 51 and 53 are also filled with the catalyst. After this, the open tube that is used as the inlet would be capped and the unit is ready for usage.

Louvers 61 in the partition 11 permit space 63 to breathe and also provides a high and medium frequency silencing effect.

FIGS. 6–8 illustrate a modified form of the invention in which the catalyst bed is attached to the outer shell along only two lines of contact instead of being in contact along four lines, as in the embodiment of FIGS. 1–5. The outer surfaces of the oval or annular shell 117 approach the inner surface of the outer shell 103 substantially tangentially to provide minimum contact area between the shells and maximum spacing therebetween. Additionally, the embodiment of FIGS. 6–8 incorporate the safety feature that will permit the gas to flow directly from the inlet to the outlet in the event excessive temperatures are reached in the catalyst container.

The catalyst container 101 of FIGS. 6–8 has an outer shell 103 which is preferably of oval cross section and has its opposite ends closed by end headers 105 and 107 which are interlocked with the ends of the shell. A partition 109 is located near the outlet end of the shell and spot-welded to it as indicated by the "x's." A tuning neck 111 is formed in the partition 109 so that the space 113 between it and the header 107 may be utilized as an acoustic resonator chamber to attenuate sounds of certain frequencies.

The catalyst bed 115 which is rather schematically illustrated in FIGS. 6–8, may follow the principles of construction of the oval or annular catalyst bed 21 with certain modifications that will be brought out presently. Thus, it comprises a perforated outer shell 117 and a perforated inner shell 119, the two shells defining a chamber between them 121 which will be filled with a suitable catalyst. The ends of the chamber 121 are closed by the inlet and outlet partitions 123 and 125 while the end of the inner shell 119 is closed by partitions 127 and 129 at the inlet and outlet ends, respectively. The inlet partition 127 has a flanged neck formed in it which is aligned with a neck in the inlet header 105 and these two necks will support inlet bushing 131 which therefore serves as a structural member to tie the catalyst bed 115 to the inlet header. The filler tube 133 (which is rotated out of plane and up into the plane of the paper in FIG. 6 for clarity) extends through flanged necks in the partitions 125 and 109 and the end header 107 furnishes a means for supplying and removing catalyst with respect to the chamber 121. The partition 129 has a safety feature formed in it in the form of an outlet bushing 135 which is covered by a cap 137 that is formed of a low-melting-point metal. The metal is selected so that when the temperature of the unit reaches or exceeds a certain maximum it will melt and permit the gas to flow directly from the inlet bushing 131 through the bushing 135 and into the outlet bushing 139 which is supported in and spot-welded to flanged necks in the partition 109 and the outlet header 107.

Referring now to FIGS. 7 and 8, it will be seen that the outer shell 117 is attached to the shell 103 at only two points and, with the illustrative oval shell, at the ends of the minor diameter of the ovals. For this purpose, the outer shell 117 may be formed of flat louvered metal and lockseamed to form a lockseam joint 143 which can be spot-welded to the top side of the muffler shell 103. On the bottom the outer shell 103 is preferably provided with a series of embossments as can be seen at 145 and these engage flat portions on the bottom of the shell 117 and are spot-welded to it.

In operation, it is apparent that the incoming exhaust gas will flow through the inlet bushing 131 into the interior of the shell 119. Then it will flow through the perforations or louvers in the inner shell through the catalyst bed chamber 121 and out through the outer shell 117 into the space 147 between the catalyst bed 121 and the container shell 103. From there it can flow into the outlet bushing 139. Certain silencing can be achieved by the resonator chamber 113 and, of course, the catalyst bed itself being composed of granular material and perforated shells will act to attenuate noise in the exhaust gases. The catalyst bed 121 can be drained or replenished by means of the filler tube 133 and, if desired, an additional filler tube (not shown) can be utilized as generally illustrated in FIG. 1. It the event that the catalyst bed is heated to a dangerous point, the fusible cap 137 will melt and the gases will by-pass the catalyst bed and flow directly into the outlet bushing 139.

It will be appreciated that the space around the outside of the catalyst bed furnishes a very desirable flow path for by-passed gas in the event that a by-pass mechanism is utilized to divert the flow so that it does not pass through the catalyst bed 115. Such mechanism is shown in my copending application, Serial No. 138,506 filed September 15, 1961, now U.S. Patent No. 3,201,207, issued August 17, 1965, and assigned to the assignee hereof, and the disclosure of which is incorporated by reference into the present application. By-passing is normally desired when the bed is too hot and it will be appreciated that by permitting the by-passed gases to flow the full length of the container 1 they will flow by the outside of the catalyst bed and tend to abstract heat and carry it out through the tail pipe and therefore substantially increase the speed with which the catalyst bed can be cooled.

The oval construction of the containers will enable them to be placed in position underneath a modern low-slung automobile and, in fact, it may be substituted for the conventional exhaust muffler since the catalyst container units herein described will themselves function as silencers. The space 147 between the outside of the catalyst bed 121 and the outer shell 103 of the container provides a certain amount of insulation against heat as well as sound. Additionally, this arrangement is such as to keep the maximum heat within the container thereby promoting fast warmup of the catalyst to operating temperature. The inside-out radial flow also tends to centralize the heat in the catalyst bed and promote rapid warm-up. The manner in which the catalyst bed is connected to the shell, particularly in FIGS. 6–8, is such that the bed gives and receives support from the container shell and end headers but, at the same time, is free to dissipate heat stresses and deform a substantial amount as a result of expansion and contraction during heat-up and cool-off. The clearance between the bed and shell also eliminates noise sources during relative movement.

It will be noted in FIGS. 6–8 that the outer shell 103 is not covered. This combined with its large surface oval shaped enables it to throw off a maximum amount of heat and aid in maintaining the bed temperature below a dangerous level.

While the thickness of the catalyst beds shown herein is relatively small and uniform, thus minimizing back pressure and warm-up time, there is a large volume so that sufficient catalyst can be provided in a unit that is about the same size as a muffler. A particular advantage of the design is in its similarity to mufflers so that it can be made with the same know-how and equipment.

If secondary air is used, it can be introduced at any desired point upstream of the catalyst beds.

What is claimed is:

1. A catalyst container for the exhaust system of an internal combustion engine comprising elongated outer shell means, exhaust gas inlet means at one end of said outer shell means, exhaust gas outlet means at the other end of said outer shell means, and means defining a catalyst bed supported within said outer shell means and defining at least partially an exhaust gas flow path through said outer shell means between said exhaust gas inlet means and said exhaust gas outlet means, said means defining said catalyst bed comprising catalyst bed outer shell means extending along at least a portion of the length of said elongate outer shell means and being in closely spaced relationship at one side thereof along a line extending substantially the full length of said catalyst bed outer shell means, one of said outer shell means being provided with a plurality of spaced embossments along said line to bring said shell means into contact at a plurality of spaced locations about said line, and means welding said shell means together at the base of each of said embossments, said shell means being in contact for at least a portion of their length at the side opposite said line.

2. A catalyst container as set forth in claim 1 wherein at least one of the outer shell means is oval in cross-section and the line relationship lies along one of the axes of said oval shell means.

3. A catalyst container as set forth in claim 1 wherein both of the outer shell means are substantially oval in cross-section and the line relationship exists along the minor axes of said shell means.

4. A catalyst container as set forth in claim 1 wherein the shell means are affixed together by welding at spaced locations on the side opposite the line.

5. A catalyst container for the exhaust system of an internal combustion engine comprising elongated outer shell means, exhaust gas inlet means at one end of said outer shell means, exhaust gas outlet means at the other end of said outer shell means, and means defining a catalyst bed supported within said outer shell means and defining at least partially an exhaust gas flow path through said outer shell means between said exhaust gas inlet means and said exhaust gas outlet means, said means defining said catalyst bed comprising catalyst bed outer shell means extending along at least a portion of the length of said elongate outer shell means, at least one of said outer shell means being substantially oval in cross-section, said outer shell means being in closely spaced relationship along one side of one axis of said oval outer shell means, means welding said outer shell means together at a plurality of spaced locations along said one side, said outer shell means being in contact for at least a portion of their length on the opposite side of said one axis.

6. A catalyst container as set forth in claim 5 wherein the one side lies along the minor axis of the oval outer shell means.

7. A catalyst container as set forth in claim 5 wherein the outer shell means are affixed together by welding at a plurality of spaced locations on the opposite side.

8. A catalyst container as forth in claim 5 wherein both of the outer shell means are oval in cross-section and the sides lie on the minor axis of said oval outer shell means.

References Cited by the Examiner

UNITED STATES PATENTS

| | | | |
|---|---|---|---|
| 2,787,119 | 4/1957 | Giambruno. | |
| 2,853,367 | 9/1958 | Karol et al. | 23—288 |
| 2,928,492 | 3/1960 | Nelson | 23—288 |
| 3,041,149 | 6/1962 | Houdry | 23—288 |
| 3,065,595 | 11/1962 | Gary | 23—288 X |
| 3,072,457 | 1/1963 | Bloch | 23—288 X |
| 3,083,084 | 3/1963 | Raymond | 23—288 |
| 3,090,676 | 5/1963 | Johnson | 23—288 |
| 3,090,677 | 5/1963 | Scheitlin et al. | 23—288 |
| 3,094,394 | 6/1963 | Innes et al. | 23—288 |
| 3,146,073 | 8/1964 | Johnson | 23—288 |
| 3,149,925 | 9/1964 | Scheitlin | 23—288 |
| 3,154,388 | 10/1964 | Purse | 23—288 |

FOREIGN PATENTS

| | | |
|---|---|---|
| 142,388 | 7/1935 | Austrian. |
| 439,766 | 12/1935 | Great Britain. |
| 911,490 | 5/1954 | Germany. |

MORRIS O. WOLK, *Primary Examiner.*

J. SCOVRONEK, *Assistant Examiner.*